Jan. 27, 1970   F. G. BACK   3,492,076
LENS TESTING APPARATUS
Filed Sept. 18, 1967   2 Sheets-Sheet 2
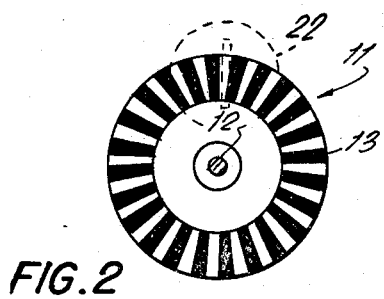
FIG. 2
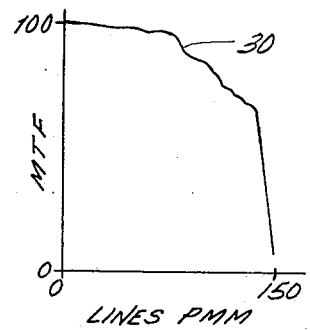
FIG. 3
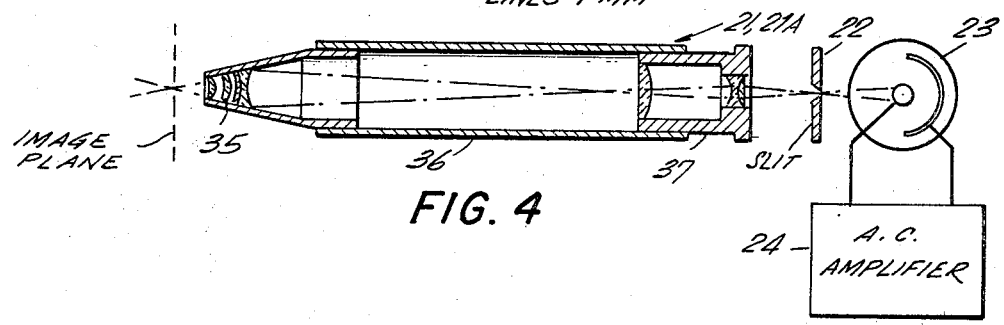
FIG. 4
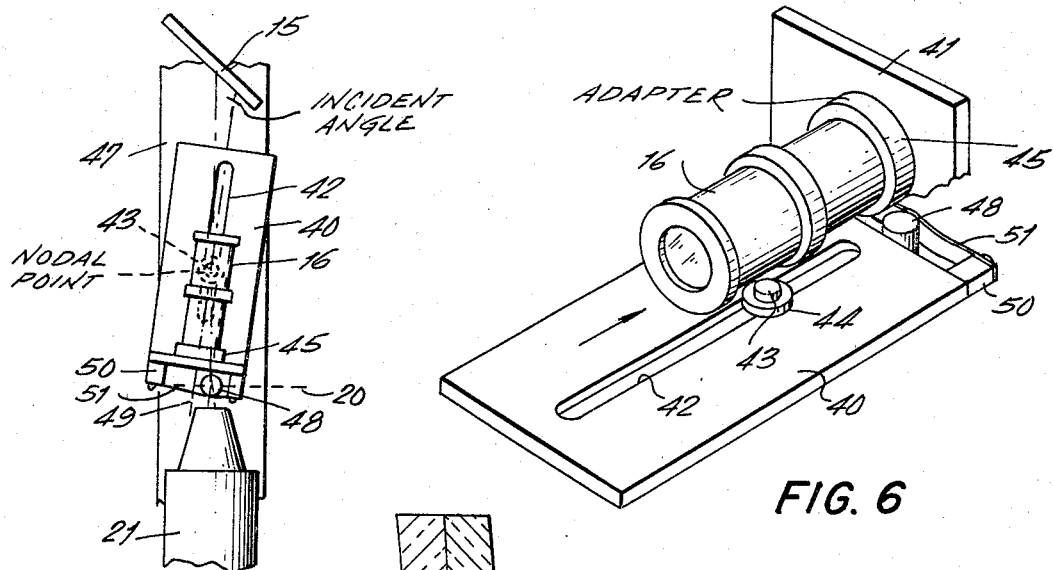
FIG. 5
FIG. 6
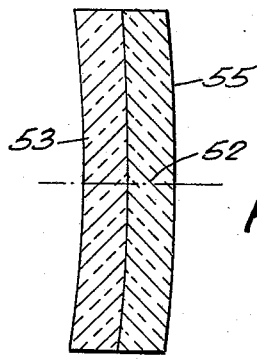
FIG. 7
INVENTOR.
FRANK G. BACK
BY Albert Kronman
ATTORNEY

United States Patent Office 3,492,076
Patented Jan. 27, 1970

3,492,076
LENS TESTING APPARATUS
Frank G. Back, 55 Sea Cliff Ave.,
Glen Cove, N.Y. 11542
Filed Sept. 18, 1967, Ser. No. 668,531
Int. Cl. G01b 9/00
U.S. Cl. 356—124                5 Claims

ABSTRACT OF THE DISCLOSURE

A device for determining the modulation transfer function of a lens or lens combination is described. The modulation transfer function is expressed as a percentage and indicates the percentage of the information in the object transferred to the image. Light from a moving target is collimated to make the rays parallel and directed through the lens under test. The image produced by the lens is then examined by a microscope, a slit, and a photocell. The output of the photocell is applied to an electric meter which gives a value proportional to the transfer function.

BACKGROUND OF THE INVENTION

This invention relates to an apparatus for testing lenses to determine their ability to transfer information of an object to an image. The invention has particular reference to an apparatus and a method for testing optical devices which is independent of the personal opinion of an observer and relies only upon precise meter readings.

It has been customary in the past to evaluate lens systems by the number of lines per millimeter which could be resolved. However, such a method depends upon the judgment of an observer who must decide when the lines in an image can no longer be seen as separate entities. As the number of lines in a target are increased within an area, the resolution of the lines in the image decreases gradually. It has been found that resolution values alone do not give the true worth of a lens since a reduction in contrast between the white and black areas may be present at the same time that the lines are distinct.

The present invention measures a lens characteristic which is termed the "modulation transfer function" or "M.T.F." This means that if a lens at 100 lines per millimeter has a 50% modulation transfer function, 50% is transmitted to the image and 50% is lost while passing through the lens.

A device for measuring the M.T.F. was set forth in a patent application, Ser. No. 515,095, now Patent No. 3,447,874 filed Dec. 20, 1965, by Frank G. Back. In this device the target comprised a series of black lines on a transparent base and the target was moved through the object plane of a lens at a speed which produced a predetermined frequency. After passing through the lens under test, the image was examined by a photocell and a meter, the resulting reading was the modulation transfer function. The present invention uses many components of the prior system but instead of deriving an arbitrary meter reading, the lens under test is compared with an optical system having a known transfer function. A parabolic mirror is used as the standard because it has no aberrations on axis and therefore 100% M.T.F. Since two systems are used in conjunction, the transfer functions of the microscope, the slit, the amplifier, and the meter cancel each other and the combination of the two meter readings is a true function of the worth of the lens under test.

One of the features of the present invention is a recorder which can be used to produce curves showing the transfer function of a lens.

Another feature of the present invention is the use of a modified nodal slide for the lens under test to ensure the position of the target image as always on axis of the microscope regardless of the incident angle.

For a better understanding of the present invention, together with other details and features thereof, reference is made to the following description taken in connection with the accompanying drawings.

BRIEF DESCRIPTION OF THE DRAWINGS

FIGURE 2 is a side view of the target wheel.

FIGURE 3 is a graph showing a modulation transfer function for a lens as plotted by the recorder.

FIGURE 4 is a cross-sectional view of the microscope, the slit, and the photocell, showing these components in greater detail.

FIGURE 5 is a top plan view of the lens under test with the lens holder turned at an angle to determine the transfer function for off axis rays and for determining the position of the second nodal point.

FIGURE 6 is an isometric view partly broken away of a modified nodal slide which may be used to mount the lens under test.

FIGURE 7 is a cross-sectional view of a modified Mangin mirror used in the present invention.

DESCRIPTION OF THE PREFERRED EMBODIMENT

Figure 1:
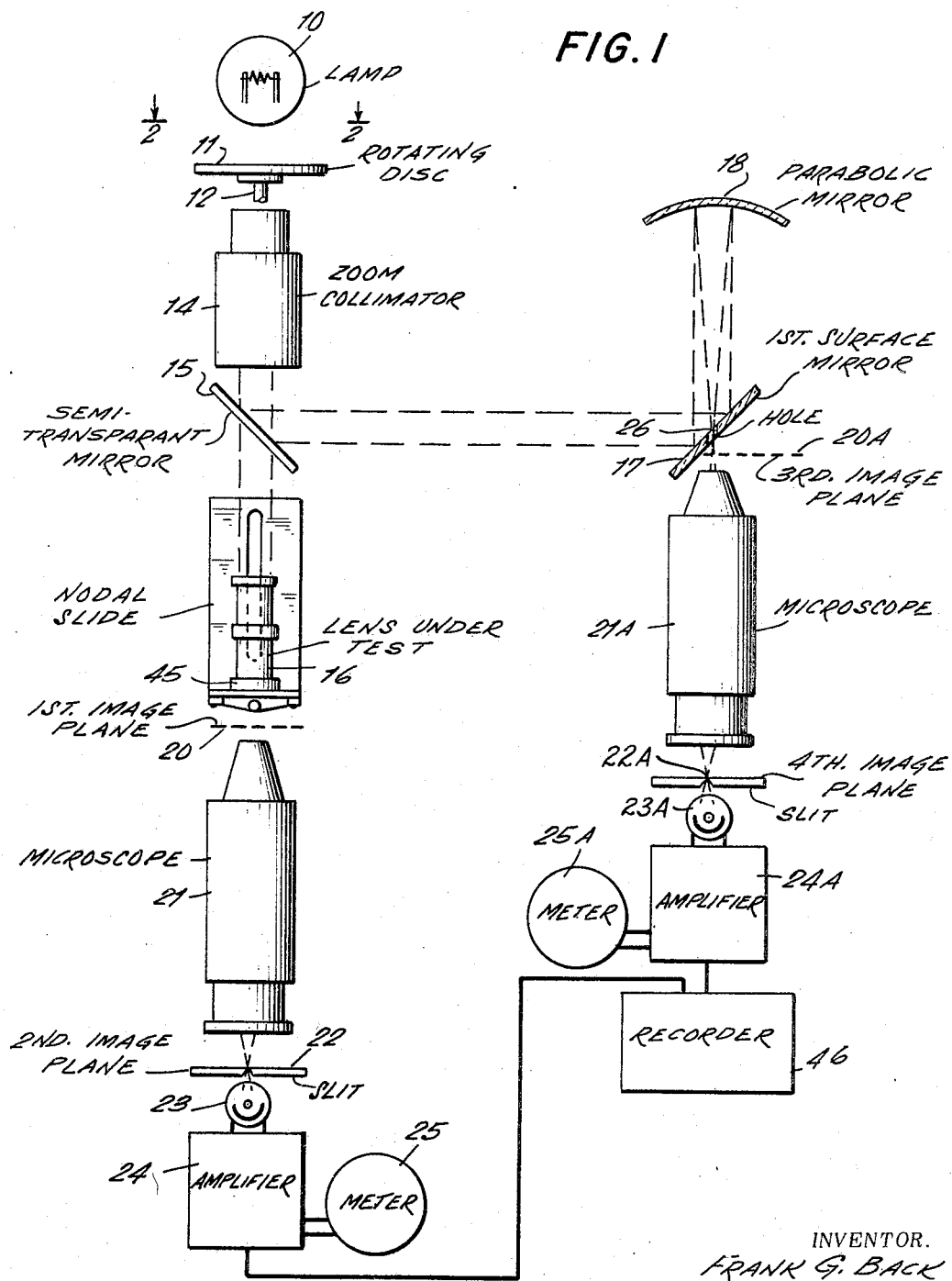
FIGURE 1 is a schematic diagram of the testing apparatus showing all the major components.

Referring now to FIGURES 1 and 2, the lens testing system includes a source of light 10 which may be an incandescent tungsten filament lamp. A transparent rotating disk 11 is placed in the path of the light rays for presenting light pulses to the lens under test. A condensing lens (not shown) may be used to direct more of the light from the lamp 10 to the system but this is not necessary. The rotating disk 11 is mounted on a shaft 12 which is coupled to a motor (not shown) for rotation at a predetermined speed. The peripheral areas of the disk are provided with evenly spaced opaque areas 13 (see FIGURE 2) to alternately cut off the light beam and thus generate light pulses for the two measuring systems in the device. Thus a constant electrical frequency is generated, which permits the elimination of higher harmonics by application of a narrow band pass filter in the electronic circuit. Precise measurement of the electrical pulses are therefore made possible.

The target disk is located in the focal plane of a zoom collimater. After leaving the collimater 14, the parallel rays are split into two beams by a half-silvered mirror 15, one beam directed to the lens 16 under test and the other beam directed to a first surface mirror 17 and thence to a parabolic mirror 18. In this manner both beams are equally affected by the optical characteristics of the collimator. Light rays passing through lens 16 are focused to an image plane 20. This image is "viewed" by a microscope 21 (shown in greater detail in FIGURE 4) and, after magnification, the image rays pass through a slit 22 and are then applied to a photocell 23. The photocell is coupled to an amplifier 24 and the output of the amplifier is connected to a meter 25 and a recorder.

The second part of the light beam, which is diverted by the semi-transparent mirror 15 to the parabolic mirror 18 is focused to an image plane 20A after passing through a hole 26 in mirror 17. A microscope 21A picks up the image 20A and projects it to form another magnified image at slit 22A. The light pulses which pass through the slit 22A are applied to photocell 23A which is coupled to amplifier 24A and meter 25A.

The calibration of the instrument is very easily obtainable by swinging the target wheel out of the collimator beam and replacing it by a zero spatial frequency wheel consisting of a large rotating disk with holes modulating the entire beam, again at a predetermined time frequency.

By changing the focal length of the zoom collimator 14, the magnification of the target image in the 2nd and 4th image plane can be varied. This means that the number of lines per millimeter at the respective slits can be set from a maximum to a minimum. For the same spatial frequency, one meter 25 gives the modulation output of the lens under test, the other meter 25A the modulation output of the parabolic mirror. Since the modulation output of the parabolic mirror is 100% the quotient between the two meter readings has to be the modulation transfer in percent of the lens under test.

This quotient can then be plotted on a graph by a recorder 46 as shown in FIGURE 3 where the modulation transfer function is the ordinate and the lines per millimeter is the abscissa. One such curve 30 is shown in FIGURE 3 and represents the axial transfer characteristic of a lens under test. It is also possible to swing the lens under test to measure the off axis contrast modulation transfer for many angular positions.

Referring to FIGURE 4, there will be seen the details of the microscope slit and transducer arrangement employed in the present invention. The microscope 21 includes the usual array of objective lenses 35, a barrel 36 and an eye-piece 37. Light entering the microscope is directed through the slit 22 into the photo-sensitive transducer 23 as herein above more fully set forth.

FIGURES 5 and 6 illustrate in detail the portions of the apparatus by means of which off axis modulation transfer functions of the lens under test can be measured. As shown in FIGURE 6, the lens under test 16 is secured to a vertical plate member 41 by mean of an adapter 45. The adapter is of a length such that the film plane of the lens under test will always lie at the same place within the lens testing apparatus. This point is indicated by the dashed lines 20 in FIGURE 5. The plate 41 is provided with an opening (not shown) to transmit the light passing through the lens 16 into the microscope 21. The plate 41 is carried by a longitudinally slotted slide 40. The slide 40 in turn is secured to a base structure 47 by means of a bolt 43 and washer 44. A fixed guide pin 48 is secured to the support 49 for the microscope 21. The guide 48 is held captive to the slotted slide 40 by means of a bracket 50. The bracket 50, which is secured to the slide 40, is provided with a yielding spring wall 51 which permits the slide 41 to move to the desired off axis positions without moving away from the fixed guide 48. The importance of this arrangement will be apparent when it is noted that the guide 48 is disposed immediately below the film plane of the lens under test, when the proper adapter 45 is employed.

The above described mounting permits an examination of the lens under test while passing off axis rays of light. The mounting is in effect a nodal slide. In this connection, the mounting may be used to determine the position of the second nodal point. As is well known, for all lenses in air, the second nodal point, corresponds in position to the second principal point and the distance from this point to the image is equal to the focal distance of the lens combination.

While the previous description has been directed to an apparatus employing a parabolic mirror, it is well known that there are technical difficulties in the manufacture and use of such mirrors. Accordingly, it is within the concept of the present invention to substitute a modified Mangin type mirror 52 for the parabolic mirror 18 in the present invention. The Mangin type mirror is free of sperical aberration and achromatized.

A specific example of the modified Mangin mirror 52 as used in the present invention is shown in FIGURE 7. It will be observed that the mirror 52 consists of a first concave glass element 53, a second concave glass element 54 cemented thereto and an aluminized rear reflecting surface 55. The element 53 is made of dense crown glass and the element 54 is made of flint glass. The specifications for the first and second elements are as follows:

MANGIN MIRROR

| Lens No. | Radius (mm.) | Thickness (mm.) | Glass Cat. Ref. | Index, $N_d$ | Dispersion, D |
|---|---|---|---|---|---|
| 53 | −380.23 ±1,452.85 | 8.50 | SK–16 | 1.6204 | 100.29 |
| 54 | +551.86 | 8.50 | F–2 | 1.620 | 36.34 |

From the foregoing, it will be seen that there has been provided a simplified apparatus for determining the modulation transfer function of any lens or lens combination. This apparatus is free of many of the limitations and errors inherent in prior art devices. The apparatus lends itself to rapid, highly accurate determinations.

Having thus fully described the invention, what is claimed as new and desired to be secured by Letters Patent of the United States, is:

1. Apparatus for determining the modulation transfer function of an optical device comprising, a light source, a target disk moving at a selected constant speed for modulating the light from the light source, a variable magnification system for receiving the modulated light from the target disk and for focusing it into a beam of parallel light rays, a beam splitter mounted in the path of the parallel light beam for dividing the beam into a first and second beam;

a lens to be tested mounted in the path of the first beam for converging the beam to focus at a first image plane, a first microscope lens system mounted in the path of the first beam for magnifying the image at the first image plane and for converging the beam to a second focus at a second image plane, a first slit mounted in the second image plane, and a first light-to-electrical transducer and a first amplifier mounted adjacent to the first slit for converting the first modulated beam into a first electrical signal for registration on a first meter;

a first surface mirror mounted in the path of the second beam for deflecting the second beam along an axial path, said mirror having an axial hole therein, an achromatized aberration free mirror with its axis aligned with said axial path for reflecting and focusing the second beam in a third image plane by passing said light through the first surface mirror hole, a second microscope lens system to receive the light off the second beam for magnifying the image at the third image plane and for converging the beam to a fourth focus at a fourth image plane, a second slit mounted in the fourth image plane, and a second light-to-electrical transducer and a second amplifier mounted adjacent to the second slit for converting the second modulated beam into a second electrical signal for registration on a second meter and recorder means connected to said first and second amplifiers responsive to said signals to indicate the modulation transfer function.

2. Apparatus as claimed in claim 1, wherein the achromatized aberration free mirror is a parabolic mirror.

3. Apparatus as claimed in claim 1, wherein the achromatized, aberration free mirror is a Mangin-type mirror.

4. Apparatus as claimed in claim 1, wherein said beam splitter is a flat mriror having a semi-transparent reflecting coating.

5. Apparatus as claimed in claim 1, wherein said lens is secured to a swingable mount, the axis of which may be adjusted to coincide with the second nodal point of the lens system.

References Cited

FOREIGN PATENTS 970,369   9/1964   Great Britain.

JEWELL H. PEDERSEN, Primary Examiner

T. MAJOR, Assistant Examiner